(12) United States Patent
Murdock et al.

(10) Patent No.: US 10,043,407 B2
(45) Date of Patent: Aug. 7, 2018

(54) INTERACTIVE BOOK WITH PROXIMITY, TOUCH, AND/OR GESTURE SENSING

(71) Applicant: Disney Enterprises, Inc., Burbank, CA (US)

(72) Inventors: Malcolm Murdock, Los Angeles, CA (US); Michael Hy, Los Angeles, CA (US); Mohammad Poswal, Santa Clarita, CA (US); Taylor Hellam, Fresno, CA (US); Nikita Pashenkov, Los Angeles, CA (US)

(73) Assignee: Disney Enterprises, Inc., Burbank, CA (US)

(*) Notice: Subject to any disclaimer, the term of this patent is extended or adjusted under 35 U.S.C. 154(b) by 281 days.

(21) Appl. No.: 14/849,417

(22) Filed: Sep. 9, 2015

(65) Prior Publication Data

US 2016/0343264 A1 Nov. 24, 2016

Related U.S. Application Data

(60) Provisional application No. 62/165,839, filed on May 22, 2015.

(51) Int. Cl.
*G09B 5/00* (2006.01)
*G09B 5/06* (2006.01)
*G06F 3/16* (2006.01)

(52) U.S. Cl.
CPC ............. *G09B 5/062* (2013.01); *G06F 3/16* (2013.01)

(58) Field of Classification Search
CPC ............ G09B 5/062; B62D 3/123; G06F 3/16
See application file for complete search history.

(56) References Cited

U.S. PATENT DOCUMENTS

| | | | | |
|---|---|---|---|---|
| 6,655,586 B1* | 12/2003 | Back | ............ | G06K 7/0008 235/375 |
| 2007/0298398 A1* | 12/2007 | Smirnov | ............ | A63H 33/38 434/309 |
| 2008/0129508 A1* | 6/2008 | Boss | ............ | G09B 5/062 340/572.4 |
| 2009/0191531 A1* | 7/2009 | Saccocci | ............ | G09B 5/062 434/317 |
| 2011/0111382 A1* | 5/2011 | Binyamin | ............ | G09B 5/062 434/317 |
| 2013/0171603 A1* | 7/2013 | Self | ............ | G09B 5/065 434/317 |
| 2013/0316321 A1* | 11/2013 | Herz | ............ | G09B 5/06 434/317 |
| 2016/0063876 A1* | 3/2016 | Javidan | ............ | G09B 5/062 434/317 |

* cited by examiner

*Primary Examiner* — Peter Egloff
(74) *Attorney, Agent, or Firm* — Farjami & Farjami LLP (57) ABSTRACT

There is provided an interactive book having a plurality of printed pages, where at least one of the plurality of pages includes at least one interactive element, the interactive book configured to wirelessly connect to a media device, transmit a first signal to the media device via the wireless connection, the first signal including a book ID uniquely identifying the interactive book, detect a current page of the plurality of pages, wherein the current page is being viewed by a user, receive an activation signal from the at least one interactive element when a user interacts with the at least one interactive element, and transmit a second signal to the media device via the wireless connection based on the current page and the activation signal.

17 Claims, 9 Drawing Sheets

INTERACTIVE BOOK WITH PROXIMITY, TOUCH, AND/OR GESTURE SENSING

RELATED APPLICATION(S)

The present application claims the benefit of and priority to a U.S. Provisional Patent Application Ser. No. 62/165,839, filed May 22, 2015 and titled "Enhanced Book Reading," which is hereby incorporated by reference in its entirety into the present application.

BACKGROUND

Various types of interactive books exist, including coloring books, pop-up books, books with textured pages, books with sound effects, etc. Each type of interactive book provides the user with an enhanced experience through an enhanced interaction with the book, such as enhanced graphics, a tactile experience, an auditory experience, or creatively interacting with the book and altering the book. Through interactions with the books, user can become more attached to a story or a character in the story.

SUMMARY

The present disclosure is directed to an interactive book with proximity, touch, and/or gesture sensing, substantially as shown in and/or described in connection with at least one of the figures, as set forth more completely in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
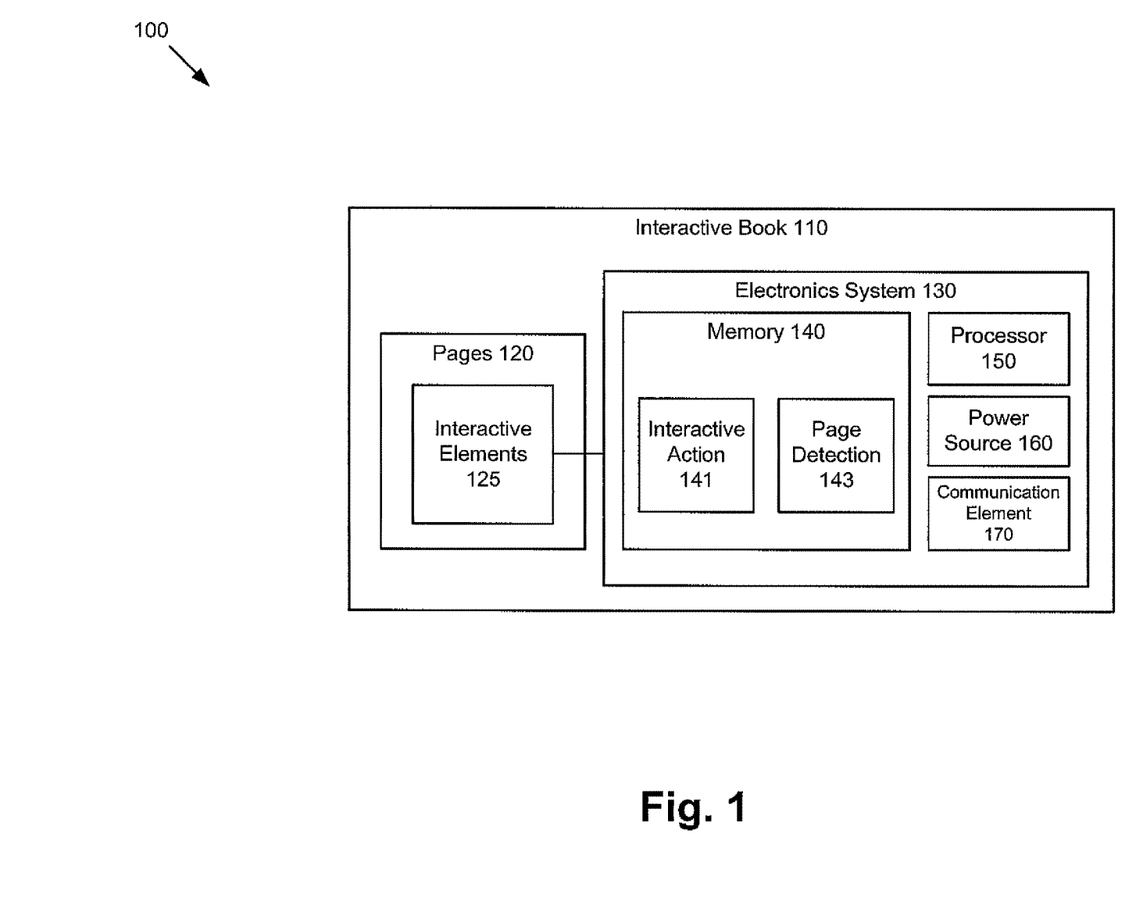
FIG. 1 shows an exemplary diagram of an interactive book with proximity, touch, and/or gesture sensing, according to one implementation of the present disclosure.

FIG. 1 shows an exemplary diagram of interactive book 110 with proximity, touch, and/or gesture sensing, according to one implementation of the present disclosure. Interactive book 110 shown in diagram 100 includes pages 120 and electronics system 130. Each of pages 120 of interactive book 110 has one or more interactive elements 125. Electronics system 130 includes memory 140 and processor 150. Processor 150 is a hardware processor, such as a central processing unit (CPU) used in computing devices. Processor 150 may be configured to receive signals from interactive elements 125 and send signals to a media device. Memory 140 is a non-transitory storage device for storing computer code for execution by processor 150, and also for storing various data and parameters. Memory 140 includes interactive actions 141 and page detection 143, which are software codes for execution by processor 150 to perform specific actions in response to receiving signals indicative of a user interaction with one of interactive elements 125.

Pages 120 in interactive book 110 may include printed text or graphics. In some implementations, a page of pages 120 may include one instance of interactive elements 125, more than one instance of interactive elements 125, or no instances of interactive elements 125. In some implementations, interactive elements 125 may include text or a graphic printed on a page of pages 120, which may be printed using conductive ink. Conductive ink is ink that can be used in printed text or graphics that, when touched, acts like a button. Pages 120 may include text printed in conductive ink. Conductive ink text may be connected to electronic system 130 using conductive traces. In some implementations, each page of pages 120 may contain conductive text. In other implementations, some pages of pages 120 may contain conductive ink text and other pages may not. In some implementations, conductive ink may appear in a different color for ease of user perception. Conductive ink text may be electronically connected to electronics system 130 by conductive traces.

In other implementations, interactive elements 125 may include conductive traces embedded in a page of pages 120, or interactive elements 125 may include capacitive sensors, such as capacitive sensors placed in a cover of interactive book 110, such as embedded in the back cover of interactive book 110. Each interactive element of interactive elements 125 may be activated by a user interaction. When a user activates an interactive element of interactive elements 125, the interactive element may send an activation signal to processor 150.

Each interactive element of interactive elements 125 may connect to electronics system 130. Electronics system 130 may include memory 140, processor 150, power source 160, and communication element 170. In some implementations, electronics system 130 may be embedded in the cover of interactive book 110, or electronics system 130 may be a removable system that can be transferable between a plurality of interactive books. Electronics system 130 may be programmable, such that electronics system 130 may be updated to include new and/or additional interactive elements 125 and/or new or additional interactive actions 141. Firmware of electronics system 130, residing in memory 140, may be updated wirelessly. For example, updated firmware may be uploaded to electronics system 130 from an application on a wirelessly connected media device. Updates to the firmware may enable electronics system 130 to recognize new interactions corresponding to interactive elements of interactive book 110, or to be compatible with new interactive books.

Interactive action 141 is a software code for execution by processor 150 defining an action associated with interactive elements 125 and may be utilized in sending an activation signal when a user activates an interactive element of interactive elements 125. Interactive actions 141 may include an interactive action corresponding with each interactive element of interactive elements 125. When interactive elements 125 involves gesture sensing, interactive action 141 may receive an activation signal from interactive element 125 indicating that a user has performed a sliding motion. Alternatively, interactive actions 141 may receive an activation signal indicating a user has touched a page of pages 120 to activate touch sensing, or that a user has placed the user's hand or finger in proximity to a page of pages 120. Interactive actions 141 may include actions corresponding to repeated or continuous interaction, such as repeatedly tapping a touch sensitive area of a page of pages 120, making a linear gesture by sliding a touch across a page of pages 120 in a linear motion, or making a non-linear gesture by sliding a touch in an arc, a circle, or other on-linear motion across a page of pages 120.

Page detection 143 is a software code for execution by processor 150 for detecting a current page of pages 120 being viewed by the user. In some implementations, the page detection 143 may provide reliable page detection within a short duration after each page turn. Page detection 143 may use a radio frequency identification (RFID) device or tag, such as a passive or active RFID device, or inductive sensing embedded in each page of pages 120 to detect the current page. In some implementations, page detection 143 may use RFID tag readers and/or antennas in a cover of interactive book 110, such as the back cover of interactive book 110, to detect the current page. In some implementations, the current page may be detected by an electronic signal being sent from pages 120 to processor 150 by, for example, an electronic contact. In such an implementation, each page of pages 120 may send a signal to processor 150 corresponding to the page that is currently being viewed. In some implementations, this may be a physical connection, e.g., an electronic contact to indicate interactive book 110 is open to the corresponding page of pages 120. In some implementations, a proximity detector, indicating that interactive book 110 is open to the corresponding page of pages 120, may send the signal.

Power source 160 of electronic system 130 provides power to the multimedia book 100. Power source 160 may be an integrated power source or a removable power source. In some implementations, power source 160 may include interchangeable batteries, rechargeable batteries, a photovoltaic cell, a plurality of photovoltaic cells, or other suitable power source for interactive book 110.

Communication element 170 may be configured to receive a communication cable such as a universal serial bus (USB) port, Firewire port, Ethernet cable port, telephone cable port, HDMI port. In some implementations, communications element 170 can be configured to receive a transferable memory device, such as an SD card, mini SD card, micro SD card, USB memory device (thumb drive), a memory stick, or other configurations of transferable memory known in the art. Communications port 160 may also used to recharge the battery, e.g., using a USB cable.

In some implementations, communication element 170 may include a wireless communication element and may be used to establish and/or maintain a wireless connection, such as a wireless connection with a media device using WiFi, cellular, Bluetooth, or other wireless technologies known in the art. In some implementations, it may be desirable to connect with a media device having a display, such as a media device, a smart phone, or other suitable media device. A suitable media device may display graphics, play audio, and may receive user input, for example, by a touch-screen interface. For example, when a user activates interactive element 125, the current page and the corresponding interactive action 141 may be wirelessly transmitted by electronics system 130 to the media device. The media device, which may be running an application corresponding to interactive book 110, may receive the current page and interactive action 141, and may perform an action using a display and/or speakers of the media device. In some implementations, communication element 170 may transmit a unique book ID corresponding to interactive book 110 to a media device.

Figure 2:
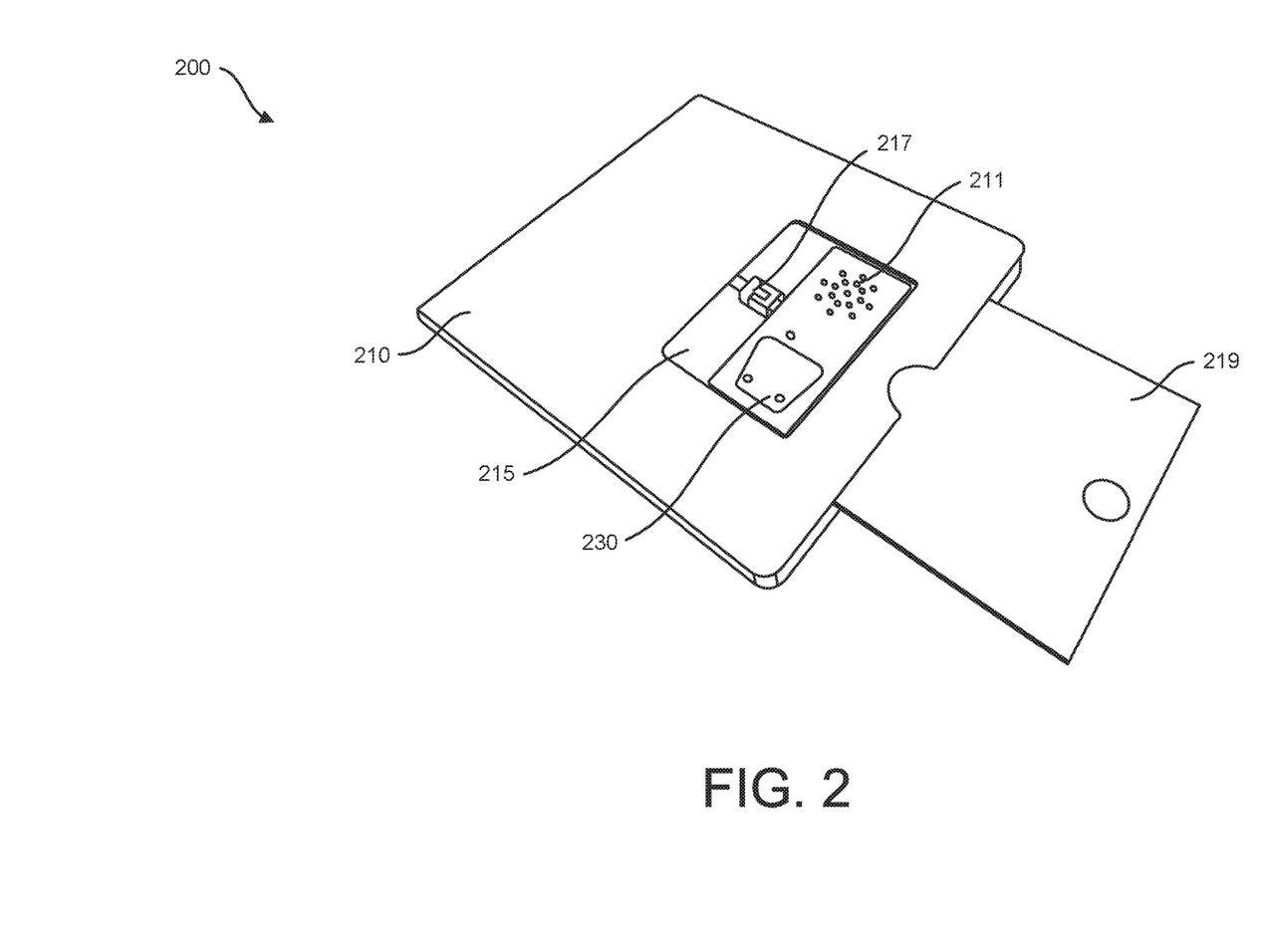
FIG. 2 shows an exemplary electronics system of the interactive book of FIG. 1, according to one implementation of the present disclosure.

FIG. 2 shows an exemplary electronics system of the interactive book of FIG. 1, according to one implementation of the present disclosure. Diagram 200 shows interactive book 210 including electronics system 230. In some implementations, interactive book 210 may include electronics bay 215. As shown in FIG. 2, electronics system 230 is housed in electronics bay 215 and includes speaker 211. Interactive book 210 may be connected to electronics system 230 by connector 217. In some implementations, connector 217 may include a plug having a pin or a plurality of pins. Each interactive element 125 may connect to a pin of connector 217, and when a user activates an interactive element of interactive elements 125, the activated interactive element may send an activation signal to electronics system 230. Electronics bay 215 may include electronics bay cover 219, which may completely cover electronics bay 215, concealing electronics system 230. In some implementations, electronics system 230 may be removable, and electronics system 230 may be interchangeable with other interactive books.

Figure 3:
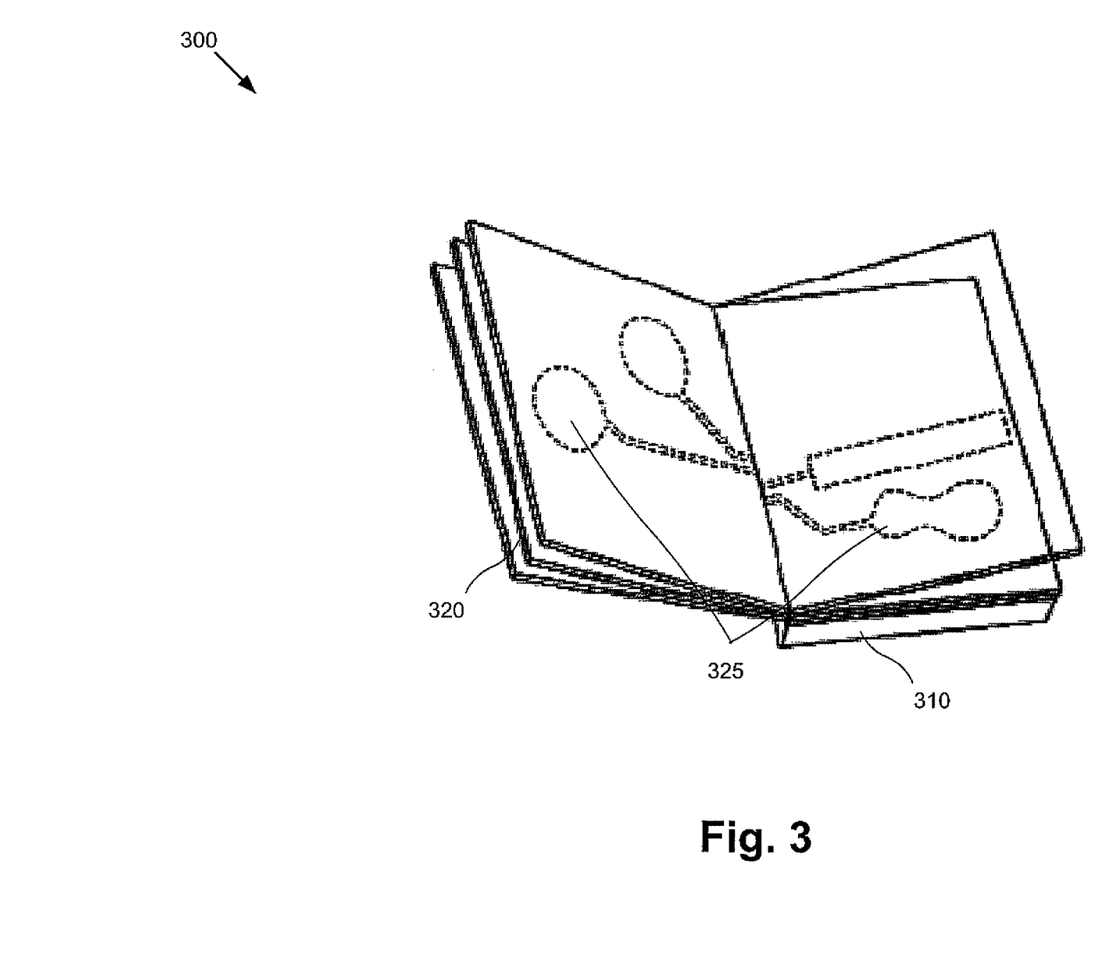
FIG. 3 shows a diagram of an implementation of the interactive book of FIG. 1 with embedded sensors, according to one implementation of the present disclosure.

FIG. 3 shows a diagram of an implementation of the interactive book of FIG. 1 with embedded sensors, according to one implementation of the present disclosure. Diagram 300 shows interactive book 310 including interactive element 325. As shown in FIG. 3, interactive element 325 is included in page 320 as sensing electrodes formed by conductive traces. Conductive traces may be embedded in the page 320 and may be used to sense the touch of the user's finger, the swipe of the user's finger, and may be configured to sense a direction of the swipe. Conductive traces may be included on a back side of page 320, or conductive traces may be embedded inside page 320, such that the conductive trace is not visible to the user. Each conductive trace may connect to electronics system 130 directly or through a connector, such as connector 217. Interactive element 325 may correspond to text on page 320, or to a graphic printed on page 320. In some implementations, interactive element 325 may include text printed using conductive ink, the conductive ink text being connected to electronics system 130 directly or through a connector, such as connector 217.

Figure 4:
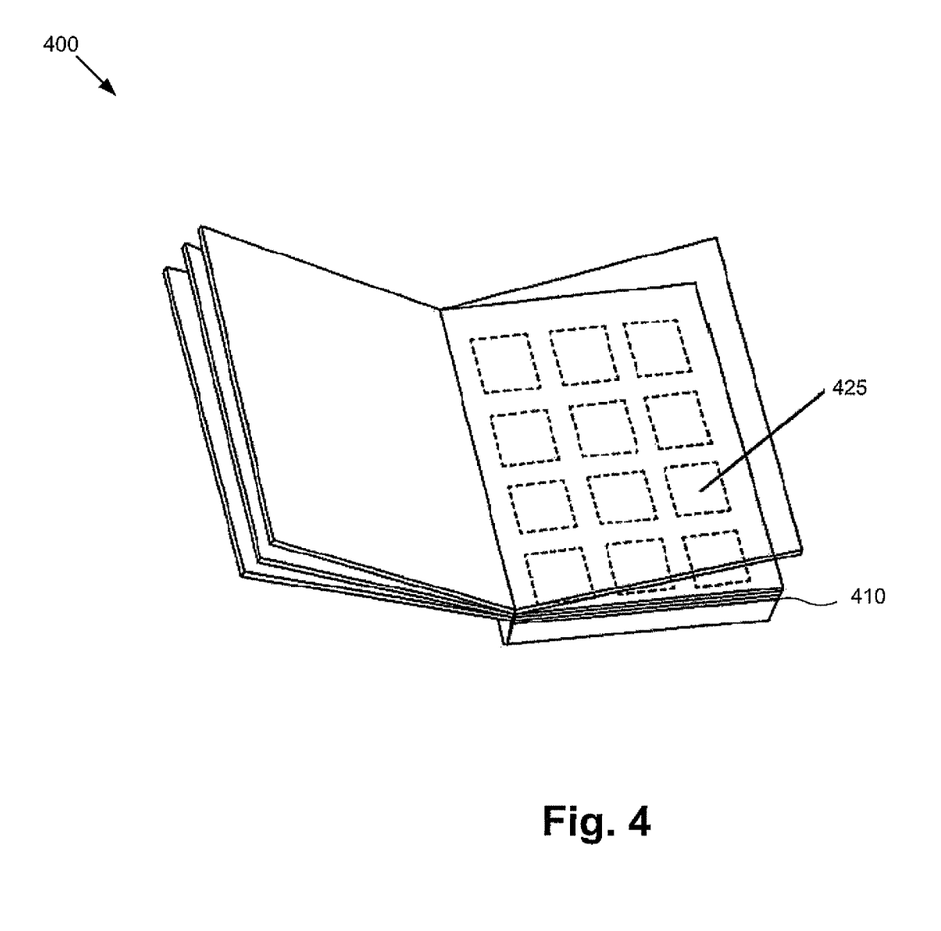
FIG. 4 shows a diagram of an implementation of the interactive book of FIG. 1 with capacitive sensors, according to one implementation of the present disclosure.

FIG. 4 shows a diagram of an implementation of the interactive book of FIG. 1 with capacitive sensors, according to one implementation of the present disclosure. As shown in diagram 400, the back cover of interactive book 410 may include a grid of capacitive sensors. In some implementations, capacitive sensors in the cover of interactive book 410 may be included in electronics system 130, which may be removable. Different implementations of interactive book 410 may include text or graphics at different locations in interactive book 410, and the grid arrangement of interactive elements 425 may be used for proximity sensing, touch sensing, and gesture sensing.

Figure 5A:
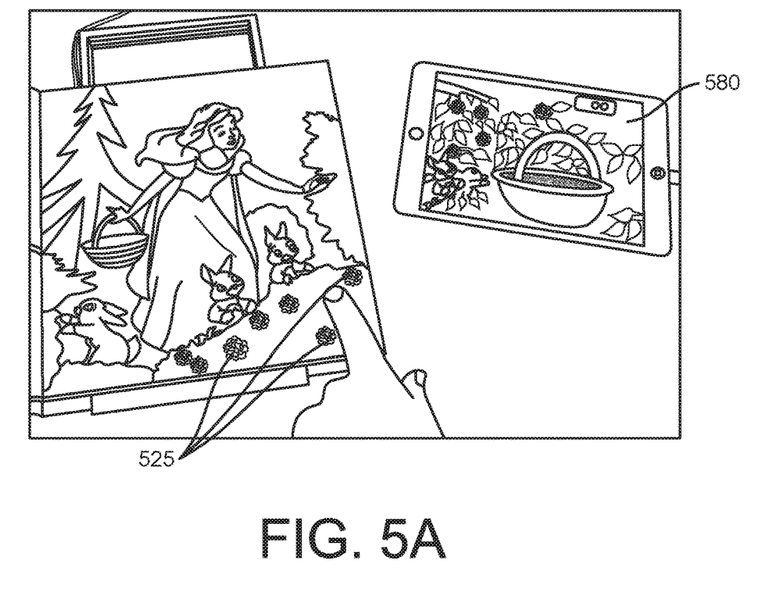
FIGS. 5a and 5b show exemplary touch sensing interactions with the interactive book of FIG. 1, according to one implementation of the present disclosure.
Figure 5B:
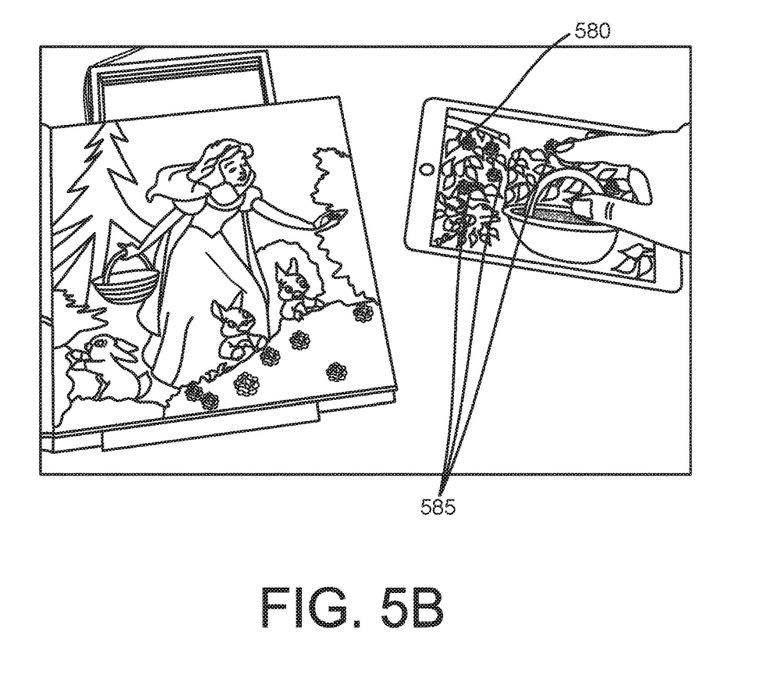

FIGS. 5a and 5b show exemplary touch sensing interactions with the interactive book of FIG. 1, according to one implementation of the present disclosure. Diagram 500 shows a page of book 510 having interactive elements 525 with touch sensitivity for interacting with media device 580. FIG. 5a shows media device 580 including a graphic corresponding to the current page of book 510. As shown, the page includes touch sensitive interactive elements 525 corresponding to graphics depicting berries on a bush, and as the user touches each berry in book 510, a corresponding berry appears in the image shown on the display of media device 580. The touch display of media device 580 may allow the user to interact with the berries on the bush. Diagram 550 of FIG. 5b shows the user interacting with media device 580 by touching the berries on the screen of media device 580.

Figure 6A:
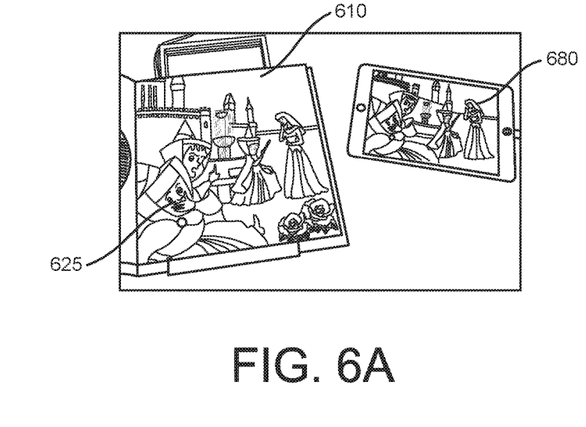
FIGS. 6a, 6b and 6c show exemplary proximity sensing interactions with the interactive book of FIG. 1, according to one implementation of the present disclosure.
Figure 6B:
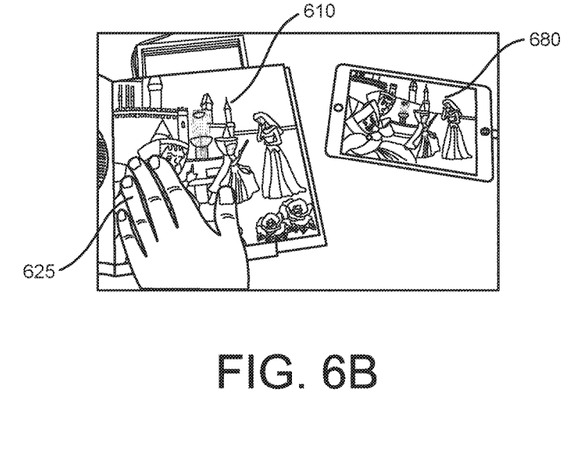
Figure 6C:
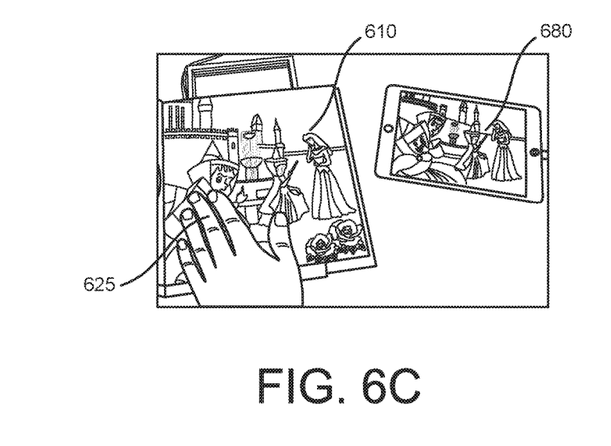

FIGS. 6a, 6b, and 6c show exemplary proximity sensing interactions with the interactive book of FIG. 1, according to one implementation of the present disclosure. FIG. 6a depicts interactive book 610 and media device 680. The image shown on the screen of media device 680 corresponds to the current page of interactive book 610. FIG. 6b shows a user activating interactive element 625, which is a proximity-sensing element. Media device 680 may play audio corresponding to the current page of interactive book 610. The scene depicted in FIG. 6b includes two fairies talking to each other, with the audio of the dialog playing over the speakers of media device 680. As the user's hand approaches the current page, the volume of the fairies' dialog reduces, as though the user is hushing the conversation. Using proximity detection, interactive element 625 reduces the volume of the fairies' dialog according to the proximity of the user's hand to the page. Continuing with FIG. 6c, the user's hand is shown touching the current page of interactive book 610. In the example shown, the user's touch on the page silences the fairies' dialog, and background sounds of the scene may become audible through the speaker of media device 680.

Figure 6D:
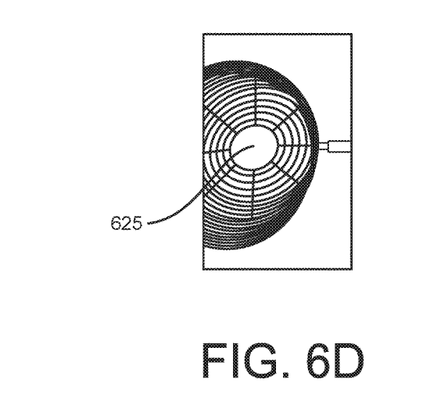
FIG. 6d shows an exemplary conductive trace for use by the interactive book of FIG. 1 to support the proximity sensing interactions shown in FIGS. 6a-6c, according to one implementation of the present disclosure.

FIG. 6d shows an exemplary conductive trace for the interaction of FIGS. 6a-6c, according to one implementation of the present disclosure. In some implementations, concentric circles and arcs of interactive element 625 may be used to create an electric field, and interactive book 610 may use changes to, or disruptions in, that electric field for proximity sensing. In some implementations, the sizes of the circles and arcs used to form interactive element 625 may determine the proximity sensing sensitivity of interactive element 625.

Figures 7A, 7E:
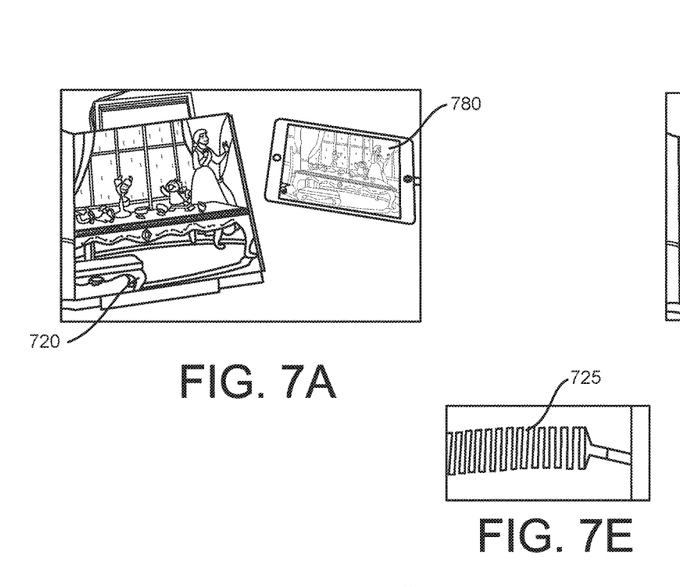
FIGS. 7a, 7b, 7c and 7d show exemplary gesture interactions with the interactive book of FIG. 1, according to one implementation of the present disclosure.
FIG. 7e shows an exemplary conductive trace for use by the interactive book of FIG. 1 to support the gesture interactions shown in FIGS. 7a-7d, according to one implementation of the present disclosure.
Figure 7B:
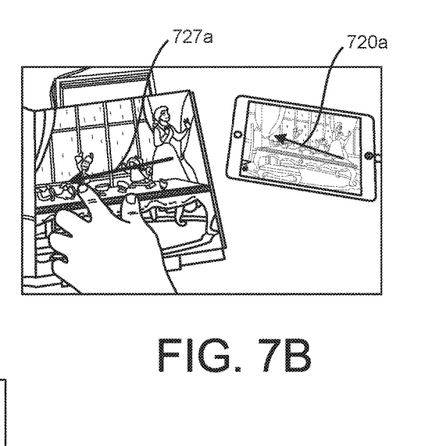
Figure 7C:
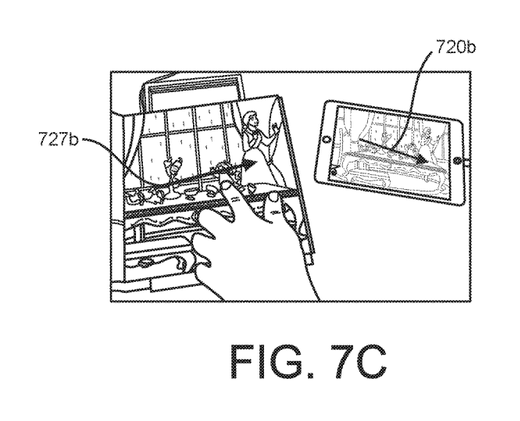
Figure 7D:
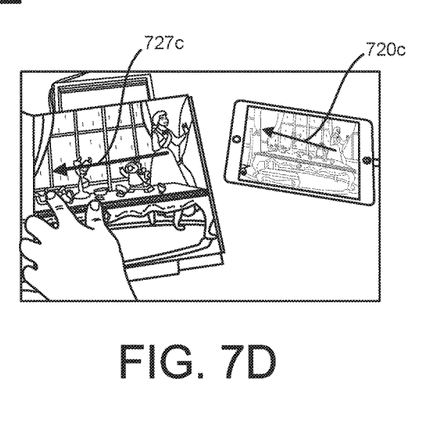

FIGS. 7a, 7b, 7c and 7d show exemplary gesture interactions with the interactive book of FIG. 1, according to one implementation of the present disclosure. FIGS. 7a-7d show a series of images of an implementation using a conductive trace to detect a touch, motion, and the direction of the motion. FIG. 7a depicts media device 780 showing an image corresponding to the current page of interactive book 710. On the display of media device 780, the characters are in the same position they appear on the page of book 710. FIG. 7b shows the user touching interactive element 725, and the characters begin to dance on the display of media device 780. FIG. 7c shows the characters move from their initial position and dance on the table in a position corresponding to the user activating interactive element 725. In FIG. 7c, the user slides the user's finger to the right along arrow 727c, a motion corresponding to sliding from one end of the table of the illustration to the other end of the table. The characters dance across the table in the same direction that the user swiped his finger, along arrow 720c. In FIG. 7d, the user slides his finger back to the left side of the table in the illustration, along arrow 727c, and the characters dance across the table on the display of media device 780 along arrow 720c. As shown in FIG. 7e, interactive element 725 includes conductive traces used to sense the touch of the user, and the swipe of the user's finger, are embedded in the page of book 710. Conductive traces may be included on a back side of a page having touch sensitivity, or conductive traces may be embedded inside a page having touch sensitivity, such that the conductive trace is not visible to the user.

Figure 8A:
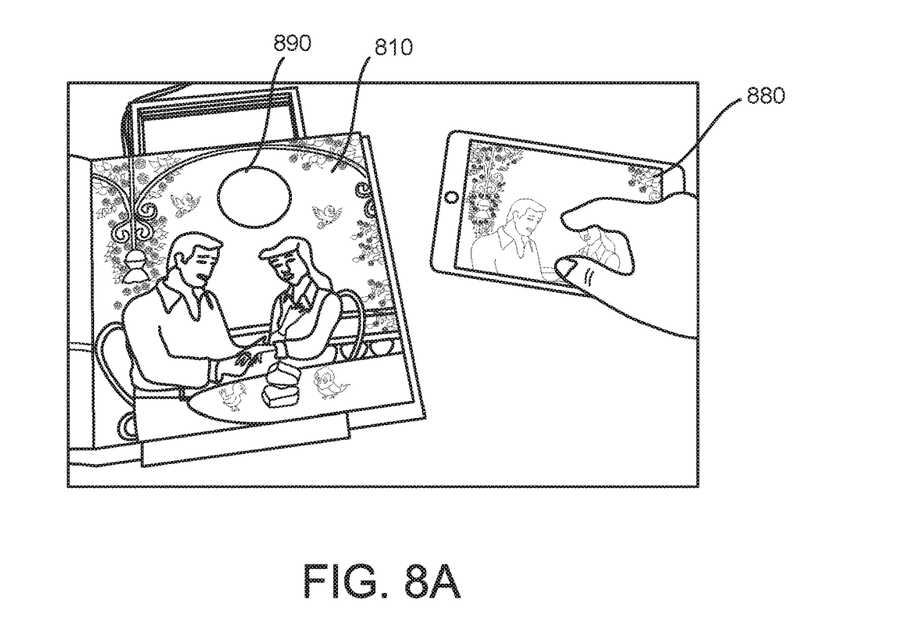
FIGS. 8a and 8b show exemplary user interactions with the interactive book of FIG. 1, according to one implementation of the present disclosure.
Figure 8B:
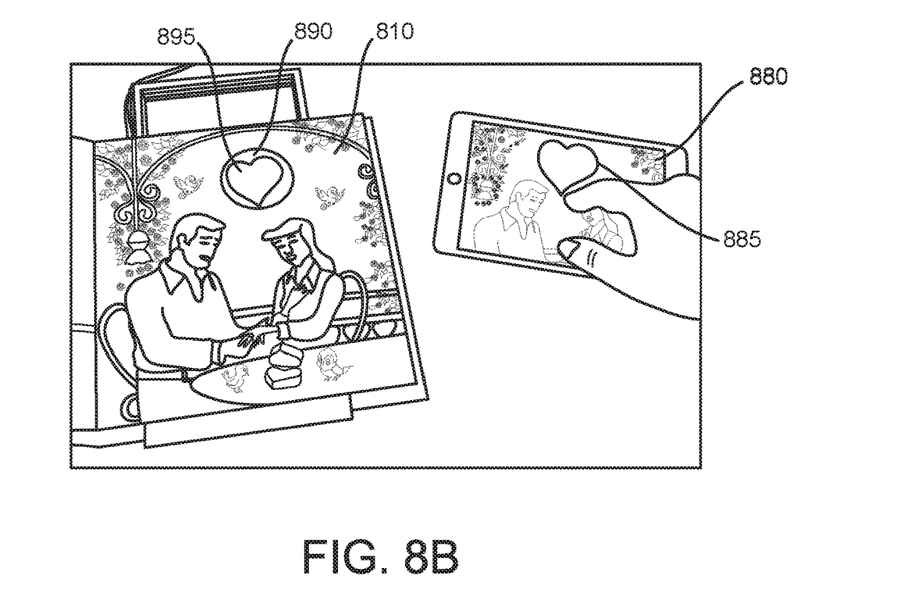

FIGS. 8a and 8b show exemplary user interactions with the interactive book of FIG. 1, according to one implementation of the present disclosure. FIG. 8a shows a user interacting with media device 880, specifically, the user draws heart 885 around a castle in the image appearing on the screen of media device 880. In response to the user's interaction with the screen, media device 880 sends an input signal to interactive book 810. In some implementations, media device 880 may send the input signal to interactive book 810 over a wireless connection. FIG. 8b shows heart 895 appearing on screen 890 in response to receiving the input signal from media device 880.

Figure 9:
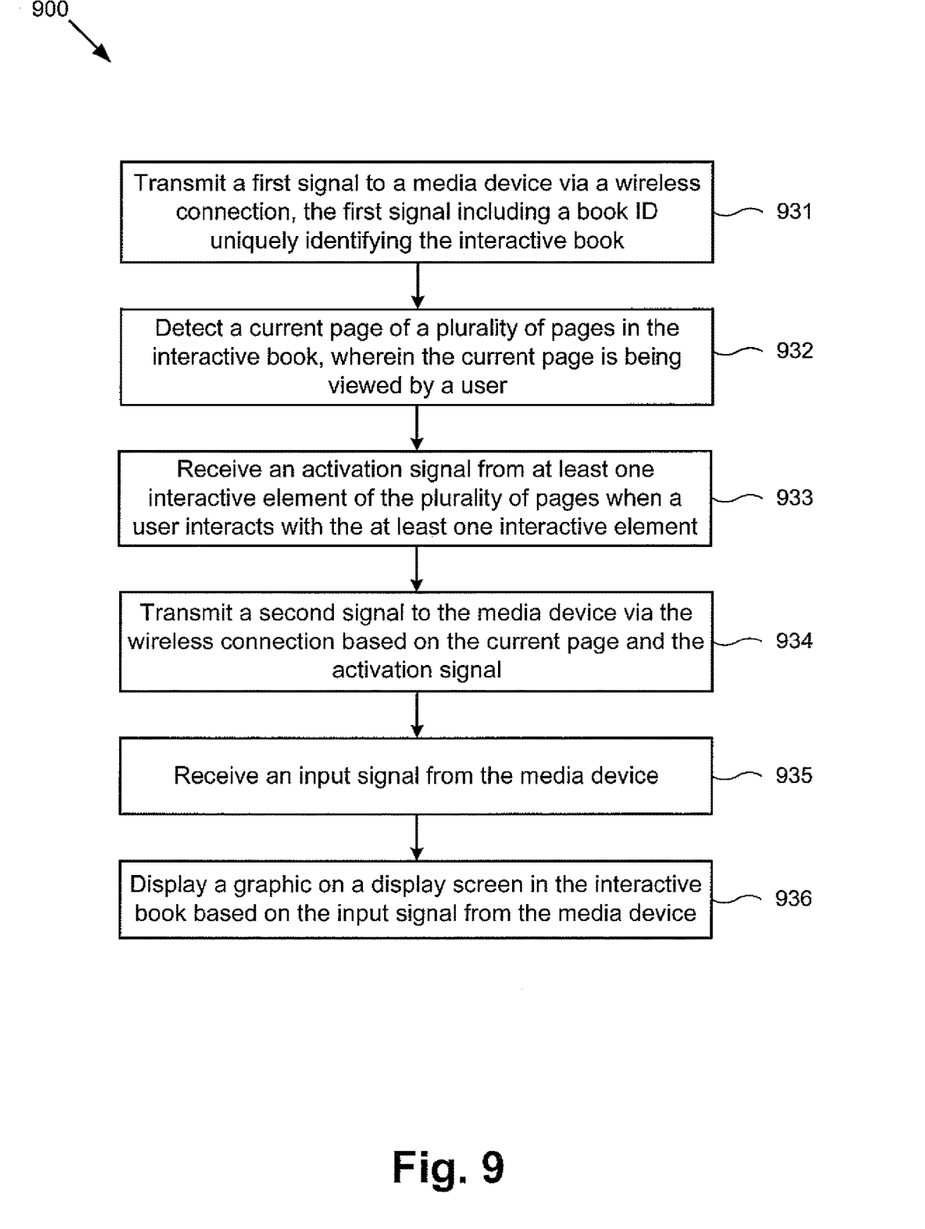
FIG. 9 shows an exemplary flowchart illustrating a method of providing an interactive reading experience, according to one implementation of the present disclosure.

FIG. 9 shows an exemplary flowchart illustrating a method of providing an interactive reading experience, according to one implementation of the present disclosure. Flowchart 900 begins at 931, where interactive book 110 transmits a first signal to a media device, the first signal including a book ID uniquely identifying interactive book 110. In some implementations, interactive book 110 may include a wireless connection element, such as connection element 170, suitable to establish a wireless connection with the media device, such as a WiFi connection, a BT connection, or other suitable wireless connection. In some implementations, the first signal may be transmitted via a wireless connection.

At 932, interactive book 110 detects a current page of a plurality of pages in the interactive book, wherein the current page is the page being viewed by a user. In some implementations, interactive book 110 may detect the current page using RFID technology. Each page of interactive book 110 may include an RFID tag in a certain location, and the location of the RFID tag on each page may be specific to each page. Interactive book 110 may include an array of RFID antennas in the back cover. In some implementations, each tagged page may have a corresponding antenna, such that the current page may be determined using the proximity of each RFID tag and its corresponding RFID antenna. In other implementations, interactive book 110 may determine the current page using a camera. To detect the page using RFID tags, an RFID tag may be embedded in each page of interactive book 110 in a particular location on the page. The cover of interactive book 110 may have a corresponding tag reader in a corresponding location, such that when interactive book 110 is closed, each RFID tag on each page is in close proximity to its corresponding tag reader. When a user opens interactive book 110 and turns the first page, the RFID tag on the first page will no longer be in close proximity to its corresponding tag reader. Accordingly, interactive book 110 may detect that the first page has been turned. The current page to which interactive book 110 is open may be determined by detecting which RFID tags are in close proximity to their corresponding tag readers. Alternatively, the current page may be determined using an array of multiplexed RFID antennas.

In some implementations, inductive sensors may be used to detect the current page of interactive book 110. Inductive sensors may be included in the back cover of interactive book 110, and corresponding metallic markers may be embedded in each page of the plurality of pages in interactive book 110. Inductive sensors may detect the proximity of the metallic markers via magnetic fields produced by an inductive coil, and the field's interaction with eddy currents induced in the nearby object. The electrodes used for inductive sensing may be simple printed circuit board (PCB) pads or shorted loops. Furthermore, inductive sensing does not require unique tag identification, and may rely on multiplexed sensor geometry. In some implementations, page detection 143 may include optical detection, such as a camera that identifies a page number or another graphic that uniquely identifies a page of the book.

At 933, electronics system 130 of interactive book 110 receives an activation signal from at least one interactive element 125 of the plurality of pages when a user interacts with the at least one interactive element 125. Interactive element 125 may implement proximity sensing, touch sensing, or gesture sensing using printed conductive ink, conductive traces, or capacitive sensors. User interaction may activate interactive element 125 and may result in interactive element 125 sending an activation signal to processor 150.

In some implementations, a user may activate interactive element 125 by positioning the user's finger or hand near interactive element 125. Interactive element 125 may include proximity sensing capable of sensing a user's hand or finger within a range of about 15 cm from the current page. In some implementations, proximity sensing may have a range of about 1.0 cm, 2.5 cm, 5 cm, 10 cm, or any combination of the enumerated distances up to about 15 cm. Proximity sensing may include a capacitive sensor, or may include a sensor detecting disruptions in, or changes to, an electric field. Interactive element 125 using proximity sensing may include conductive traces or capacitive sensors. In some implementations, proximity sensing may include conductive traces included in page 120, or proximity sensing may include capacitive sensors. In some implementations, capacitive sensors may be included in a cover of interactive book 110, such as embedded in the back cover of interactive book 110. In some implementations, capacitive sensors used for proximity sensing may be included in electronics system 130, which may be removable.

In other implementations, a user may activate interactive element 125 by touching interactive element 125. In some implementations, touch sensing may have a touch resolution to about size of a child's fingertip, such as resolution of about one square centimeter, one half of a square centimeter, or one quarter of a square centimeter. Interactive element 125 with touch sensing may include conductive ink, conductive traces, or capacitive sensors. In some implementations, capacitive sensors may be included in a cover of interactive book 110, such as embedded in the back cover of interactive book 110. In some implementations, capacitive sensors used for touch sensing may be included in electronics system 130, which may be removable. Touch sensing may include single touch sensing, multiple touch sensing, and pressure-sensitive touch sensing. In other implementations, a user may activate interactive element 125 by making a gesture on a page of pages 120. Gesture sensing may include touch sensing combined with motion sensing. For example, gesture sensing may sense when a user touches interactive element 125 and then slides the touch across the page of pages 120.

At 934, interactive book 110 transmits a second signal to the media device via the wireless connection based on the current page and the activation signal. In some implementations, the media device includes a display and may show a scene corresponding to the current page of interactive book 110. The media device may animate the scene shown in interactive book 110, such as an animation corresponding to interactive action 141. Additionally, the media device may be interactive, such as a tablet computer with a touch-screen interface. In such an implementation, a user may interact with the scene displayed by the media device, and the media device may transmit a corresponding signal to interactive book 110. At 935, interactive book 110 receives an input signal from the media device. In response to the input signal, at 936, interactive book 110 displays a graphic on a display screen based on the input signal received from the media device.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. An interactive book for use with a media device, the interactive book including:
   a wireless communication element configured to establish a wireless connection with the media device;
   a plurality of pages, wherein at least one of the plurality of pages includes at least one interactive element having a conductive trace;
   a power source;
   a display screen;
   a memory storing at least one interactive action, wherein the at least one interactive action is associated with the at least one interactive element; and
   a processor configured to:
      transmit a first signal to the media device via the wireless connection, the first signal including a book ID uniquely identifying the interactive book;
      detect a current page of the plurality of pages, wherein the current page is being viewed by a user;
      receive an activation signal indicating a combination of a touch, a motion and a direction of the motion using the conductive trace of the at least one interactive element when a user interacts with the at least one interactive element corresponding to a character at the current page of the book, wherein the activation signal causes a display of the media device displaying the current page of the book to show the character moving in the direction of the motion;

transmit a second signal to the media device via the wireless connection based on the current page and the activation signal;

receive an input signal from the media device generated by a user touch on the display of the media device showing the current page of the book; and display a graphic based on the input signal on the display screen that is visible as part of the current page of the book.

2. The interactive book of claim 1, further including a removable electronics system.

3. The interactive book of claim 1, wherein the at least one interactive action is updateable.

4. The interactive book of claim 1, wherein the at least one interactive element is activated by gesture sensing indicative of the combination of the touch, the motion and the direction of the motion.

5. The interactive book of claim 1, wherein the at least one interactive element includes at least one of printed text and a graphic connected to a sensor embedded in the cover configured to send the activation signal when the user interacts with the at least one interactive element.

6. The interactive book of claim 1, wherein the at least one interactive element is activated by touch sensing.

7. The interactive book of claim 1, wherein the graphic corresponds to a drawing generated by the user touch.

8. The interactive book of claim 1, wherein the at least one interactive element is activated by proximity sensing.

9. A method for use with an interactive book including a plurality of pages, wherein at least one of the plurality of pages includes at least one interactive element having a conductive trace, the interactive book further including a wireless communication element, a display screen, a memory, and a processor, the method including:

transmitting, using the wireless communication element, a first signal to a media device, the first signal including a book ID uniquely identifying the interactive book;

detecting, using the processor, a current page of the plurality of pages, wherein the current page is being viewed by a user;

receiving, using the processor, an activation signal indicating a combination of a touch, a motion and a direction of the motion using the conductive trace of the at least one interactive element when a user interacts with the at least one interactive element corresponding to a character at the current page of the book, wherein the activation signal causes a display of the media device displaying the current page of the book to show the character moving in the direction of the motion;

transmitting, using the wireless communication element, a second signal to the media device based on the current page and the activation signal;

receiving, using the processor, an input signal from the media device generated by a user touch on the display of the media device showing the current page of the book; and displaying a graphic based on the input signal on the display screen that is visible as part of the current page of the book.

10. The method of claim 9, wherein the interactive book further including a removable electronics system.

11. The method of claim 9, wherein the at least one interactive actions is updateable.

12. The method of claim 9, wherein the at least one interactive element is activated by gesture sensing indicative of the combination of the touch, the motion and the direction of the motion.

13. The method of claim 9, wherein the at least one interactive element includes at least one of printed text and a graphic connected to a sensor embedded in the cover configured to send the activation signal when the user interacts with the at least one interactive element.

14. The method of claim 9, wherein the at least one interactive element is activated by touch sensing.

15. The method of claim 9, wherein the graphic corresponds to a drawing generated by the user touch.

16. The method of claim 9, wherein the at least one interactive element is activated by proximity sensing.

17. A system comprising:

a media device including a display; and an interactive book for use with the media device, the interactive book including:
 a wireless communication element configured to establish a wireless connection with the media device;
 a plurality of pages, wherein at least one of the plurality of pages includes at least one interactive element having a conductive trace;

a power source;

a display screen;

a memory storing at least one interactive action, wherein the at least one interactive action is associated with the at least one interactive element; and a processor configured to:
 transmit a first signal to the media device via the wireless connection, the first signal including a book ID uniquely identifying the interactive book;
 detect a current page of the plurality of pages, wherein the current page is being viewed by a user;
 receive an activation signal indicating a combination of a touch, a motion and a direction of the motion using the conductive trace of the at least one interactive element when a user interacts with the at least one interactive element corresponding to a character at the current page of the book;
 transmit a second signal to the media device via the wireless connection based on the current page and the activation signal;
 receive an input signal from the media device generated by a user touch on the display of the media device showing the current page of the book; and
 display a graphic based on the input signal on the display screen that is visible as part of the current page of the book;

wherein the media device is configured to:
 receive the activation signal; and
 show, on the display of the media device displaying the current page of the book, the character moving in the direction of the motion.

* * * * *